(12) United States Patent
Manral et al.

(10) Patent No.: US 7,974,185 B2
(45) Date of Patent: Jul. 5, 2011

(54) THREE FIBER LINE SWITCHED RING

(75) Inventors: Anshuman Manral, Maharashtra (IN); Praveen Chathnath, Kerala (IN); RamNarayan Srinivasan, Karnataka (IN); Sourav Das, West-Bengal (IN)

(73) Assignee: Wipro Limited, Bangalore, Karnataka (IN)

( * ) Notice: Subject to any disclaimer, the term of this patent is extended or adjusted under 35 U.S.C. 154(b) by 921 days.

(21) Appl. No.: 11/253,210

(22) Filed: Oct. 18, 2005

(65) Prior Publication Data
US 2007/0086331 A1 Apr. 19, 2007

(51) Int. Cl.
*H04L 12/42* (2006.01)
*H04J 14/00* (2006.01)
*H04J 3/14* (2006.01)

(52) U.S. Cl. ............... 370/223; 370/907; 398/4; 398/5; 398/20; 398/59; 398/83

(58) Field of Classification Search ............... 370/216, 370/221–225, 395.51, 403, 404, 452, 460, 370/907; 398/4, 5, 20, 145, 59, 83
See application file for complete search history.

(56) References Cited

U.S. PATENT DOCUMENTS

| | | | | |
|---|---|---|---|---|
| 4,539,655 | A * | 9/1985 | Trussell et al. | 710/100 |
| 5,396,357 | A * | 3/1995 | Goossen et al. | 398/59 |
| 5,953,141 | A * | 9/1999 | Liu et al. | 398/83 |
| 6,141,320 | A * | 10/2000 | Ikawa | 370/227 |
| 6,285,475 | B1 * | 9/2001 | Fee | 398/10 |
| 6,795,394 | B1 * | 9/2004 | Swinkels et al. | 370/222 |
| 7,234,079 | B2 * | 6/2007 | Cheng et al. | 714/20 |
| 7,356,258 | B1 * | 4/2008 | Weverka et al. | 398/59 |
| 7,389,045 | B2 * | 6/2008 | Fee | 398/33 |
| 2002/0009091 | A1 * | 1/2002 | Taniguchi | 370/403 |
| 2002/0093971 | A1 * | 7/2002 | Yasuo et al. | 370/403 |
| 2002/0146020 | A1 * | 10/2002 | Yamada et al. | 370/403 |
| 2003/0026281 | A1 * | 2/2003 | Limaye et al. | 370/430 |
| 2003/0170020 | A1 * | 9/2003 | Chaudhuri et al. | 398/5 |
| 2003/0214962 | A1 * | 11/2003 | Allaye-Chan et al. | 370/406 |
| 2005/0201380 | A1 * | 9/2005 | Saleh et al. | 370/395.2 |
| 2005/0244158 | A1 * | 11/2005 | Luft | 398/59 |
| 2006/0209877 | A1 * | 9/2006 | Yamamoto | 370/452 |

OTHER PUBLICATIONS

Manral et al, 3 Fiber Line Switched Ring, Ieee Xplore, 2007, Wipro Technologies, India, 3 pages.*
J. Vernon Drake, A Review of the Four Major SONET/SDH Rings, Alcatel Network Systems, Inc. IEEE 1993, pp. 878-884.*

* cited by examiner

*Primary Examiner* — Chi H Pham
*Assistant Examiner* — Ahmed Elallam
(74) *Attorney, Agent, or Firm* — Prakash Nama; Global IP Services, PLLC

(57) ABSTRACT

A 3 fiber line switched ring (3FLSR) provides protection for (optical) transmission networking wherein N nodes are connected via 3 lines (or optical fibers) in a ring topology. Two of the three fibers form a main transmission line and may transmit in one direction in the ring whereas the third might transmit in the opposite direction. This architecture of the 3FLSR provides a dual protection scheme, including a bi-directional line switching coupled with a unidirectional line switching. Traffic is categorized based on the level of protection available for the particular traffic type. The first two transmitting fibers form a bi-directional ring, carrying primary and secondary traffic which can survive 2 and 1 failures on the ring respectively. The third fiber may form a unidirectional ring, carrying additional traffic that can be pre-empted in case of multiple failures in the bi-directional ring. The 3FLSR enables reconfiguration of existing 2/4 fiber rings and conforms to applicable standards.

33 Claims, 6 Drawing Sheets

THREE FIBER LINE SWITCHED RING

FIELD OF THE INVENTION

This invention generally relates to a telecommunication transmission network, and more particularly to a ring network, e.g., an optical ring network, with a novel protection mechanism.

BACKGROUND OF THE INVENTION

Optical network technology offers a competitive manner of delivering information and services in an effective manner. Synchronous Optical Networking (SONET) solutions are an important ingredient in creating a competitive edge. The international version of SONET is known as SDH (Synchronous Digital Hierarchy) which might use a 155 Mbps payload envelope. Two types of optical protection rings are known: opaque and transparent. Transparent shared protection rings are known to have two fibers or four fibers. Generally, a two-fiber optical shared protection can perform ring switching only, whereas, a four-fiber optical shared protection ring can perform either ring switching or span switching. Optical shared protection rings are very useful survivability schemes for optical networks because they have a simple topology, efficient bandwidth usage, excellent resilience to failures and fast switching times. Survivability schemes offer protection which addresses traffic restoration in the event of failures. The functionality and configuration details of optical networking solutions are generally governed by one or more standards including GR 1230, ITU-TG 841, and GR-253 CORE.

Traffic protection in the event of failure is critical for Optical networks (Metro, Core & access) Optical networks employ different methods to achieve Automatic Protection Switching (APS). This includes linear protection schemes (1+1, 1:1, 1:N) and ring protection schemes (UPSR/SNCP, 2 Fiber BLSR/MSRing, 4 Fiber BLSR/MSRing).

Two-Fiber BLSR:
A two-fiber BLSR requires only two fibers for each span of the ring. Each fiber carries both working channels and protection channels. On each fiber, half the channels are defined as working channels and half are defined as protection channels. The normal traffic carried on working channels in one fiber are protected by the protection channels traveling in the opposite direction around the ring. This permits the bidirectional transport of normal traffic. Only one set of overhead channels is used on each fiber.
A two-fiber BLSR supports ring switching only. When a ring switch is invoked, the normal traffic is switched from the working channels to the protection channels in the opposite direction. [GR1230 and G.841].

Four-Fiber BLSR:
A four-fiber BLSR requires four fibers for each span of the ring. Working and protection channels are carried over different fibers: two multiplex sections (lines in SONET) transmitting in opposite directions carry the working channels while two multiplex sections (lines in SONET), also transmitting in opposite directions, carry the protection channels. This permits the bidirectional transport of normal traffic. The multiplex section overhead is dedicated to either working or protection channels since working and protection channels are not transported over the same fibers.
A four-fiber BLSR supports ring switching as a protection switch, as well as span switching, though not concurrently. Multiple span switches can coexist on the ring since only the protection channels along one span are used for each span switch. Certain multiple failures (those that affect only the working channels of a span such as electronic failures and cable cuts severing only the working channels) can be fully protected using span switching. [GR1230 and G.841].

SUMMARY OF THE INVENTION

The present invention provides a three fiber line switched ring (3 FLSR). A three fiber protocol for ring switching in fiber optic rings has marked advantages over existing protection schemes having a two fiber bidirectional line switch ring and a four fiber bi-directional line switched ring. The third fiber is connected to traverse selectively in a single direction, clockwise or anticlockwise, to achieve protection. Fibers as used herein may be replaced by suitable transmission lines in the event that non-optical applications are addressed. The protocol can support more than two failures and involves both unidirectional and bidirectional switching. The addition of an extra fiber provides traffic restoration in the event of failures, and can protect more than two failures without causing ring segmentation and protects the extra traffic in a 2F BLSR (two fiber bidirectional line switched ring) on a single failure. In a 2F BLSR, more than one failure will cause ring segmentation and potential loss of traffic. The present three fiber protocol achieves most of the functionalities of a 4F BLSR ring, with the reduced cost of one fiber. It is also noted that 3 FLSR can support more than two failures by processing more than one of K1-K2 bytes of STS (Synchronous Transport Signal) N frame. In one exemplary embodiment, the new three fiber line switched ring configuration enables protection of two failures without having to deal with ring segmentation, and also offers protection of extra traffic in a 2F BLSR scenario on a single failure. This embodiment resides in a method for arranging traffic transmission and protection in a ring network of N nodes, comprising the steps of: providing first and second fibers (or transmission lines) connected in a ring and spanning the N nodes for bidirectional line switching; and, adding an only additional fiber (or transmission line) as a third fiber (or transmission line) connected spanning all the nodes for unidirectional line switching. It is noted that the implementation of the inventive concept to an MSRing in place of the fiber optic ring is within the ambit of the present invention. In other words, an MSRing and BLSR are to be treated as interchangeable for purposes of this invention. It is also noted that for purposes of this invention, SONET and SDH are interchangeable in their application. In general, an optical fiber may be replaced by a transmission line in the practice of this invention A second embodiment resides in a method, using three fibers, for providing optical network traffic transmission and protection, comprising the steps of: providing the first and second fibers as a main transmission line; and, providing the third fiber to cooperate with the first and second fibers and supporting coexistence of unidirectional and bidirectional switching capability.

A third embodiment resides in three fiber line switched ring (3FLSR), comprising first and second fibers for selective use as a main transmission line, the 3FLSR including a third fiber configured for cooperating with said first and second fibers and supporting coexistence of unidirectional and bidirectional switching capability.

It is noted that the 3FLSR configuration, besides being more cost effective and offering flexibility to classify traffic, provides the option of reconfiguring existing 2/4 fiber BLSRs and obtaining 100% extra bandwidth at 50% extra cost as compared to a 2 fiber BLSR.

Also included herein are articles comprising a storage medium having instructions thereon, which when executed by a computing platform will result in methods using transmission lines or optic fibers, as recited above.

BRIEF DESCRIPTION OF THE DRAWING

A more detailed understanding of the invention may be had from the following description of exemplary embodiments, to be understood in conjunction with the accompanying drawing wherein.

DETAILED DESCRIPTION

Figure 1:
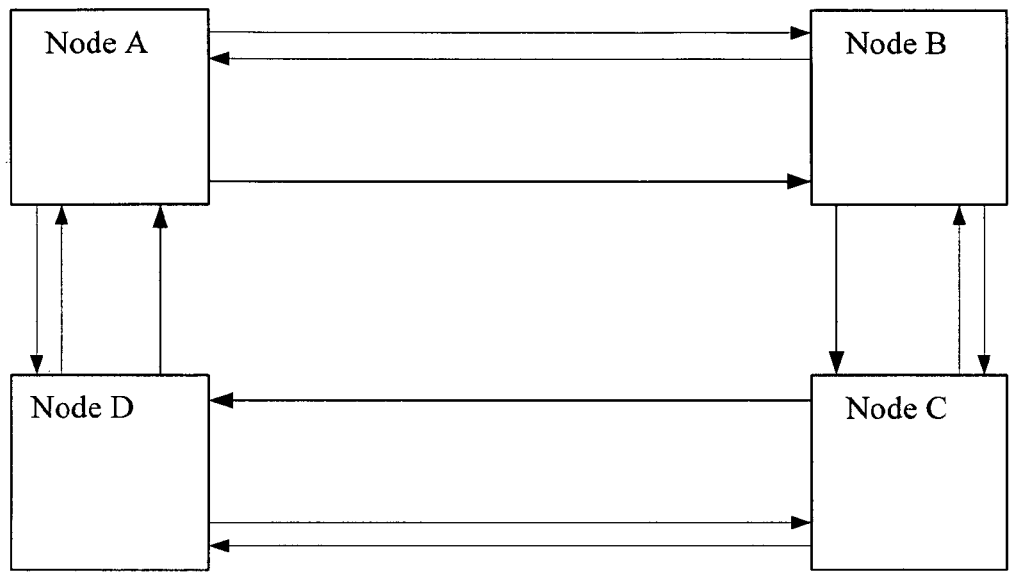
FIG. 1 illustrates 3 fiber line switched ring (3FLSR)

In the following detailed description of the various embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is therefore not to be taken in a limiting sense, and the scope of the present invention is defined only by the appended claims and their equivalents.

It is envisaged that the explanation of certain terminology as follows will assist in an understanding of the detailed description:

APS: Automatic Protection switching (APS) improves the survivability of transport systems by substituting a standby facility when failures occur. Point to Point protection systems provide protection against the failure that affect only the working line. [GR-253-CORE].

BLSR: All Bi-directional Line Switched Rings (BLSR) support ring switching. In addition, four-fiber BLSR supports span switching.

Two-Fiber BLSR: Two-fiber BLSRs require only two fibers for each span of the ring. Each fiber carries both working channels and protection channels. On each fiber, half the channels are defined as working channels and half are defined as protection channels. The normal traffic carried on working channels in one fiber are protected by the protection channels traveling in the opposite direction around the ring. This permits the bidirectional transport of normal traffic. Only one set of overhead channels is used on each fiber.

Two-fiber BLSRs support ring switching only. When a ring switch is invoked, the normal traffic is switched from the working channels to the protection channels in the opposite direction. [GR1230 and G.841].

Four-Fiber BLSR: Four-fiber BLSRs require four fibers for each span of the ring. Working and protection channels are carried over different fibers. Two multiplex sections (lines in SONET) transmitting in opposite directions carry the working channels while two multiplex sections (lines in SONET), also transmitting in opposite directions, carry the protection channels. This permits the bidirectional transport of normal traffic. The multiplex section overhead is dedicated to either working channels or protection channels since working and protection channels are not transported over the same fibers.

Four-fiber BLSRs support ring switching as a protection switch, as well as span switching, though not concurrently. Multiple span switches can coexist on the ring since only the protection channels along one span are used for each span switch. Certain multiple failures (those that affect only the working channels of a span such as electronic failures and cable cuts severing only the working channels) can be fully protected using span switching. [GR1230 and G.841].

3Fiber Line Switched Ring:

As illustrated in FIG. 1, the proposed 3Fiber Line Switched Ring requires three fibers for each span of the ring. This can be viewed as a 2Fiber ring with an added third fiber protecting both the working and protection channels in a ring. This is illustrated in FIG. 1. Note that the third fiber is connected so that throughout the ring, it traverses in a single direction (either clockwise or anti-clockwise). It performs as a unidirectional ring. This proposed 3F Line Switched Ring as described herein supports unidirectional span switch which will protect both protected and extra traffic in a 2F ring. Normal 2F BLSR ring switching will also be possible by the use of the 3 FLSR.

The following definitions are intended to assist in an understanding of the description:

Primary Traffic (Working traffic): Traffic traversing a ring normally carried in working channels, except in the event of span or ring protection switch, in which case it is restored on the protection channels. [GR 1230].

Secondary Traffic (Extra traffic): This traffic is unprotected in a ring, and is inserted in the ring protection channels in the 2F BLSR part, when the protection channels are not used for the protection of working traffic in the event of a ring switch. Extra traffic is protected in 3F Line switched ring, on the third fiber. Extra traffic is preempted when a ring switch is performed.

Additional traffic: Unprotected traffic that is inserted in the third fiber. Each channel in the third fiber can be used only once in the ring. The traffic will be sent in one direction in the ring and will be received in the other direction away from the sending direction. For example, if there is a traffic channel provided between Node D and Node B in FIG. 1, Node D will send the traffic to B via A, and node B will send the traffic to D via C. Since the Tx direction and Rx direction of the traffic traverses the whole ring, the third fiber additional traffic bandwidth cannot be re-used.

Main Fiber(s): The fibers which are used for 2F BLSR configuration.

Third fiber: The additional fiber which will be connected throughout the ring. See FIG. 1.

Switched Status in K2 Byte: The combination 100 in bits 6-8 in K2 byte will be denoted as switched status in K2 bytes as shown in the following table. In the GR1230 and G.841 standards-documents, this combination has been mentioned as 'Reserved for future use'

For applicable terminology not listed herein, reference may be had to standards GR1230 and G.841.

The following will illustrate the K1 and K2 byte structure as applicable in the implementation of the 3FLSR as described herein:

TABLE 1

K2 Byte structure

| Source node identification (Bits 1-4) | Bit 5 | Long/Short (Bit 5) | Bit 6 7 8 | Status (Bits 6-8) |
|---|---|---|---|---|
| Source node ID is set to the node's own ID. | 0 | Short path code (S) | 1 1 1 | MS-AIS |
| | 1 | Long path code (L) | 1 1 0 | MS-RDI |
| | | | 1 0 1 | Reserved for future use |
| | | | 1 0 0 | Switched (Sw) |
| | | | 0 1 1 | Extra Traffic on protection channels |
| | | | 0 1 0 | Bridged and Switched (Br&Sw) |
| | | | 0 0 1 | Bridged (Br) |
| | | | 0 0 0 | Idle |

There is no change in the K1 byte structure from GR1230 and G.841. However, the K1 byte structure is mentioned herein for the sake of completeness.

TABLE 2

K1 byte structure:

| Bits 1 2 3 4 | Bridge Request code (Bits 1-4) | Destination Node Identification (Bits 5-8) |
|---|---|---|
| 1 1 1 1 | Lockout of Protection (Span) LP-S or Signal Fail (Protection) | The destination node ID is set to the value of the ID of the node for which that K1 byte is destined. The destination node ID is always that of an adjacent node (except for default APS bytes). |
| 1 1 1 0 | Forced Switch (Span) FS-S | |
| 1 1 0 1 | Forced Switch (Ring) FS-R | |
| 1 1 0 0 | Signal Fail (Span) SF-S | |
| 1 0 1 1 | Signal Fail (Ring) SF-R | |
| 1 0 1 0 | Signal Degrade (Protection) SD-P | |
| 1 0 0 1 | Signal Degrade (Span) SD-S | |
| 1 0 0 0 | Signal Degrade (Ring) SD-R | |
| 0 1 1 1 | Manual Switch (Span) MS-S | |
| 0 1 1 0 | Manual Switch (Ring) MS-R | |
| 0 1 0 1 | Wait-To-Restore WTR | |
| 0 1 0 0 | Exerciser (Span) EXER-S | |
| 0 0 1 1 | Exerciser (Ring) EXER-R | |
| 0 0 1 0 | Reverse Request (Span) RR-S | |
| 0 0 0 1 | Reverse Request (Ring) RR-R | |
| 0 0 0 0 | No Request NR | |

NOTE -
Reverse Request assumes the priority of the bridge request to which it is responding.

Exemplary Rules for the use of the 3FLSR:
The following are exemplary rules which should be followed in the application of the 3F Line Switched Ring:
Rule 1: The system has a provision for the third fiber to selectively function in the clockwise or anticlockwise direction in the ring.
Rule 2: If there is any fiber cut anywhere in the ring, the third fiber will be considered first for protection switching. Hence the third fiber will be used first for K-byte signaling. However, for ring switching, the other fibers will be used as usual for K-Byte signaling.
Rule 3: If there is already a failure present in the ring, the traffic will be flowing through the third fiber. If a node senses another failure on the main fiber at this time, it will initiate a ring switch similar to 2F BLSR. Upon sensing a failure, a ring switch will be initiated if the node receives any of the following status in the K2 byte of the third fiber:
1. Bridged
2. Bridged & Switched
3. Switched
Note: If a node is receiving only Switched status in the third fiber, it may have an option to do 16 frame K-bytes span switch.
Rule 4: If there are two failures existing in the ring, there will be one ring switch and one span switch present in the ring. If the condition for the spanswitch gets cleared first, the ring switch (which is present due to the second failure) will be dropped and third fiber span switch will be performed for the second failure. The WTR (wait to restore) due to the recovery of the first failure will be pre-empted. The extra traffic, which was lost due to a ring switch, will be recovered.
Rule 5: If there are two failures existing in the ring, there will be one ring switch and one span switch present in the ring. If the condition for the ring switch gets cleared first, the ring switch (which is present due to the second failure) will be cleared according to normal 2F BLSR recovery procedure. The span switch due to the first failure will remain effective.
Rule 6: In the K2-Byte, the bit number 5 (short or long path) will not be considered since the signaling is only through third fiber, and since there is only one path for signaling. The main fibers will be not be used for signaling since such use will cause the extra traffic to be dropped.
Rule 7: Any switches performed in the third fiber will be considered as a span switch. Even if the traffic traverses through the whole of the ring along the third fiber, it will send SF-S in the K-bytes.

Figure 2:
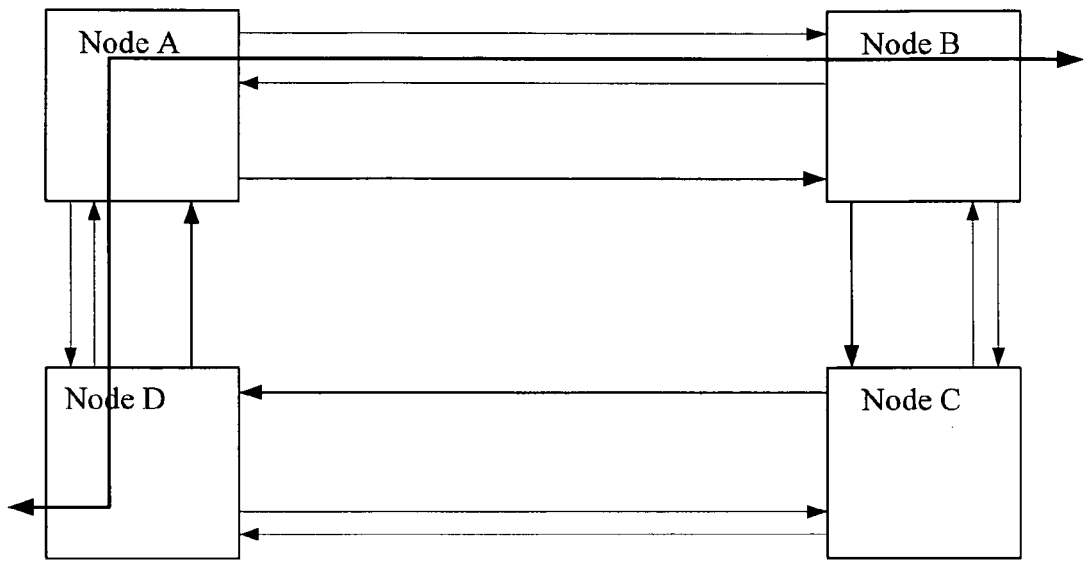
FIG. 2 illustrates a connection between two points in the ring.
Figure 3:
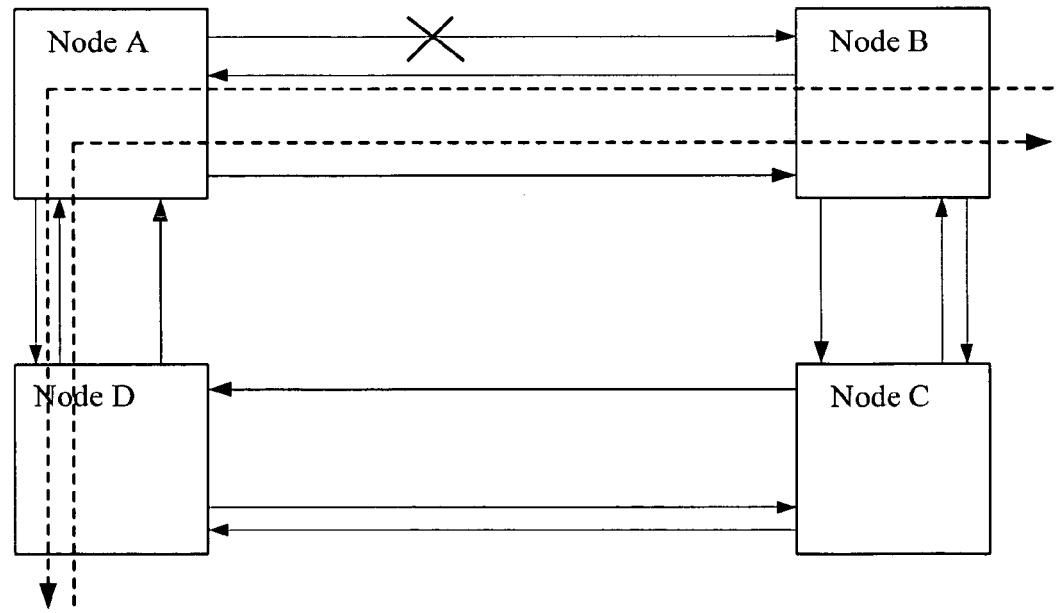
FIG. 3 illustrates a unidirectional span failure on a first main fiber.

In the following passages, several failure scenarios (S1 to S9) and the corresponding functioning of the 3 FLSR including K-byte values are described as examples. The scenarios discussed below use OC192 bandwidth for illustration:
S1. Unidirectional Span failure on the main fiber.
  S1.1 In the same direction of third fiber i.e., clock-wise (See Rule 1).
  S1.2 In the opposite direction of the third fiber. i.e., anti clockwise.
S.1.1: See FIGS. 2 and 3.
K-Byte Exchanges Upon Failure:
Node B senses the LOS in the main fiber.
The following table describes the flow of K-Bytes. The K-bytes will be signaled along the third fiber only.

TABLE 3

K-byte signaling for Unidirectional span failure

| Originating Node | K1 [1-4] (Bridge Request (Status) code) | K1 [5-8] (Destination node ID) | K2 [1-4] (Source node ID) | K2 [5] (0/1 (short/ long path code)) | K2 [6-8] (Status code) |
|---|---|---|---|---|---|
| B | SF-S | A | B | X | Idle |
| A | NR | B | A | X | Br |
| B | SF-S | A | B | X | Sw |

TABLE 4

K-byte signaling for recovery of Unidirectional span failure

| Originating Node | K1 [1-4] (Bridge Request (Status) code) | K1 [5-8] (Destination node ID) | K2 [1-4] (Source node ID) | K2 [5] (0/1 (short/ long path code)) | K2 [6-8] (Status code) |
|---|---|---|---|---|---|
| B | WTR | A | B | X | Sw |
| A | NR | B | A | X | Br |
| B (WTR expires) | NR | A | B | X | Idle |
| A (WTR expires) | NR | B | A | X | Idle |

TABLE 5

K-byte signaling for Unidirectional span failure (anticlockwise)

| Originating Node | K1 [1-4] (Bridge Request (Status) code) | K1 [5-8] (Destination node ID) | K2 [1-4] (Source node ID) | K2 [5] (0/1 (short/ long path code)) | K2 [6-8] (Status code) |
|---|---|---|---|---|---|
| A | SF-S | B | A | X | Idle |
| B | NR | A | B | X | Br |
| A | SF-S | B | A | X | Sw |

Figure 4:
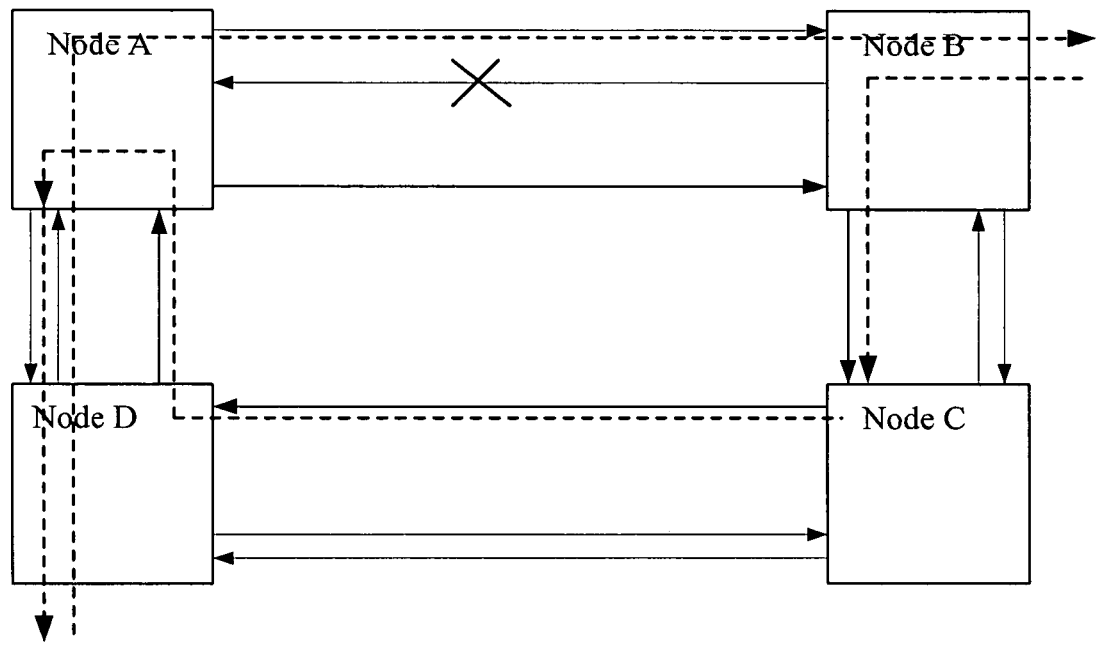
FIG. 4 illustrates a unidirectional span failure on a second main fiber.
Figure 5:
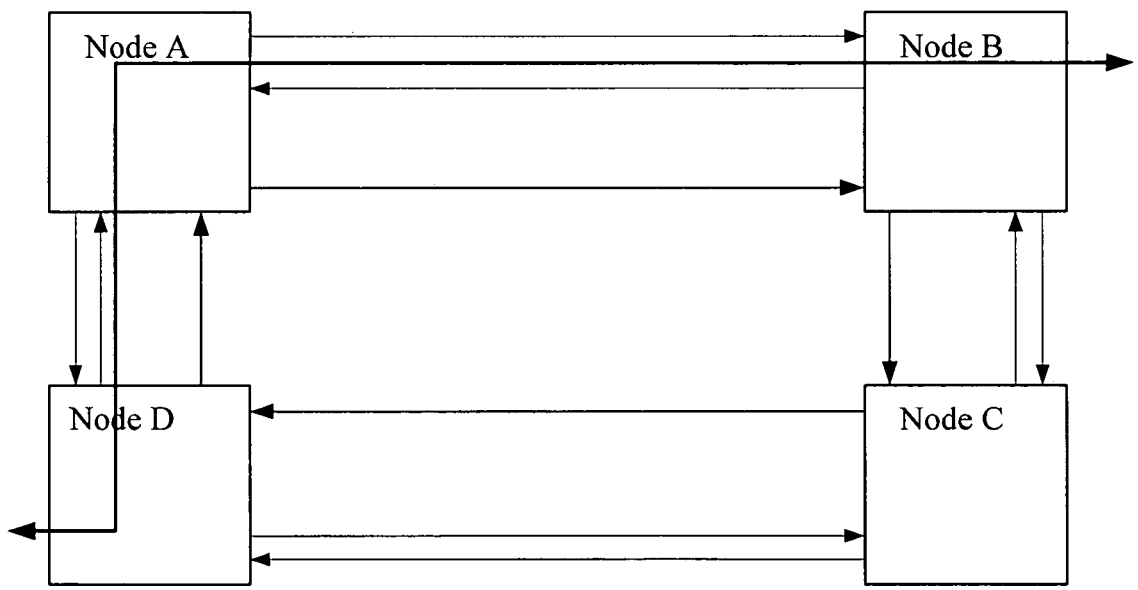
FIG. 5 illustrates a connection between nodes B and D.
Figure 6:
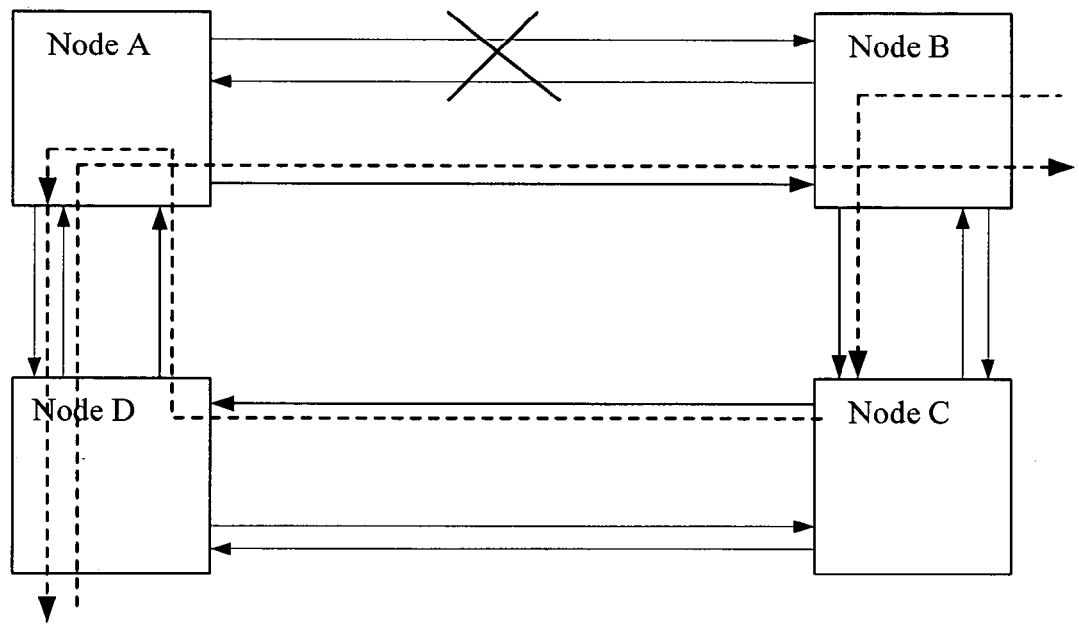
FIG. 6 illustrates bidirectional single failures on a main fiber.

S1.2 See FIG. 4.
K-Byte Exchanges Upon Failure:
Node A senses the LOS in the main fiber.
The following table describes the flow of K-Bytes. The K-bytes will be signaled along the third fiber only.
S2, Bidirectional single failure on main fiber: See FIGS. 5 and 6.
K-Byte Exchanges Upon Failure:
Both Node A and B sense the LOS in the main fiber.
The following table describes the flow of K-Bytes. The K-bytes will be signaled along the third fiber only.

TABLE 6

K-byte signaling for recovery of Unidirectional span failure (anticlockwise)

| Originating Node | K1 [1-4] (Bridge Request (Status) code) | K1 [5-8] (Destination node ID) | K2 [1-4] (Source node ID) | K2 [5] (0/1 (short/ long path code)) | K2 [6-8] (Status code) |
|---|---|---|---|---|---|
| A | WTR | B | A | X | Sw |
| B | NR | A | B | X | Br |
| A (WTR expires) | NR | B | A | X | Idle |
| B (WTR expires) | NR | A | B | X | Idle |

TABLE 7

K-byte signaling for Bidirectional span failure

| Originating Node | K1 [1-4] (Bridge Request (Status) code) | K1 [5-8] (Destination node ID) | K2 [1-4] (Source node ID) | K2 [5] (0/1 (short/ long path code)) | K2 [6-8] (Status code) |
|---|---|---|---|---|---|
| A | SF-S | B | A | X | Idle |
| B | SF-S | A | B | X | Br |
| A | SF-S | B | A | X | Br & Sw |
| B | SF-S | A | B | X | Br & Sw |

TABLE 8

K-byte signaling for recovery of Bidirectional span failure

| Originating Node | K1 [1-4] (Bridge Request (Status) code) | K1 [5-8] (Destination node ID) | K2 [1-4] (Source node ID) | K2 [5] (0/1 (short/long path code)) | K2 [6-8] (Status code) |
|---|---|---|---|---|---|
| A | WTR | B | A | X | Br & Sw |
| B | WTR | A | B | X | Br & Sw |
| A (WTR expires) | NR | B | A | X | Br |
| B (WTR expires) | NR | A | B | X | Br |
| A (WTR expires) | NR | B | A | X | Idle |
| B (WTR expires) | NR | A | B | X | Idle |

It is noted that "switched" status is required to support unidirectional span switch only. However, the "switched" status is not mandatory. If unidirectional switching is not required, even for a unidirectional failure, bi-directional switching will take place. In that case, the "switched" status is not required. This case will be same as scenario S2. Scenario S1.1 and Scenario S1.2 will be merged to scenario S2. As discussed in scenario S2, for a bidirectional span switching along the third fiber "switched" status in the K-byte is not required.

Figure 7:
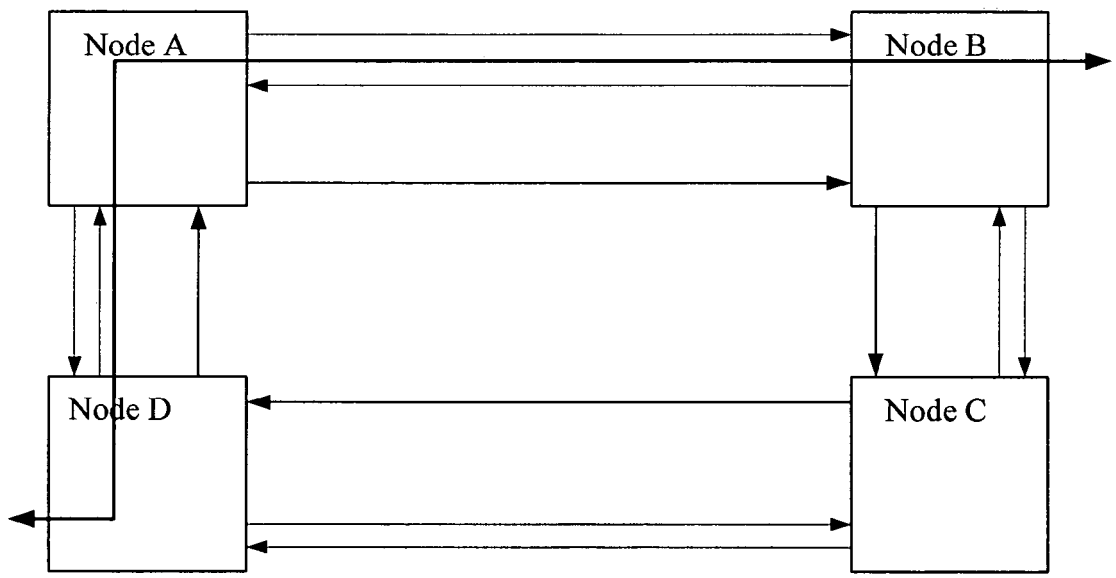
FIG. 7 illustrates a connection between nodes B and D.

S3, Unidirectional multiple span failures: See FIGS. 7 and 8.

Figure 8:
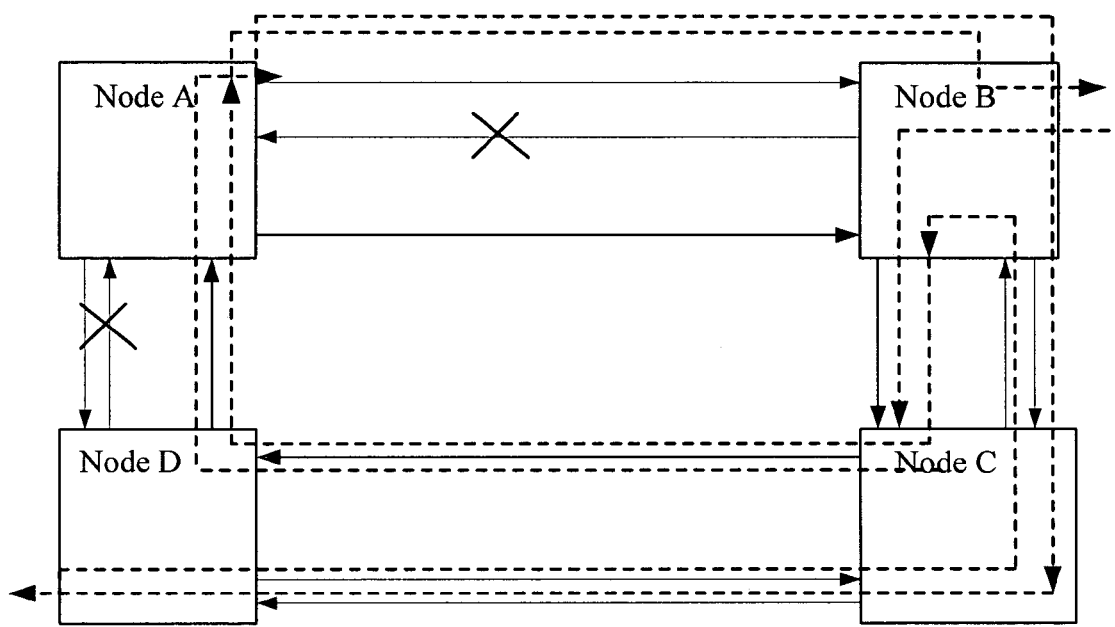
FIG. 8 illustrates bidirectional multiple span failures.

After the first cut between node A and B, according to scenario 1 (S2), the traffic flow will be as shown in FIG. 8. At this time, upon a second failure (uni/bi) in the span between A and D, a ring switch will take place between A and D. The traffic flow through the third fiber will remain unchanged. Secondary (extra) traffic will be lost as in a normal ring switch. Primary traffic will be restored.

In this case the traffic which comes from B to D in channel 1 (that is the primary traffic), will come via C, D to node A through the third fiber in channel number 1. Upon reaching the node A, it will try to go to node D via the main fibers, but it will face a ring switch and will take channel number 97 in the path between node A and B. This will travel around the ring in channel 97 through main fibers and finally reach node D. This path is shown in dotted lines.

Similarly, the other path, shown also in dotted lines from Node D to Node B will travel in the path shown in FIG. 8.

K-byte Exchanges

On the first cut, the K-Byte exchanges will be same as Table 3 and Table 4 or Table 5 and Table 6 depending on the direction of failure. The K-byte exchanges will take place on the third fiber only.

On the 2$^{nd}$ cut, normal ring switch for 2F BLSR will take place. However, this time the K-byte exchange will take place on the main fibers on channel number 97 as in 2F BLSR.

Here during recovery, there are two scenarios:
1. The 2$^{nd}$ switch clears first. i.e., the fiber cut between node A and D recovers but the cut between nodes A and B remains.
2. The 1$^{st}$ switch clears first i.e., the fiber cut between node A and B clears but the cut between node A and D remains.

In the first case, normal 2F BLSR ring switch recovery procedure, as mentioned in GR1230, will be followed. For the fiber cut between node A and B, the traffic will continue to flow along the third fiber. When the fiber cut between A and B clears, normal recovery procedure will be followed as mentioned in the scenarios S1.1 and S1.2 above.

In the second recovery scenario, when the cut between node A and B clears, the third fiber switch clears and the third fiber traffic goes into WTR (wait to restore) mode. However, there is already a ring switch existing because of the cut between A and D. This condition is not desirable because now the third fiber is free for switching, whereby a ring switch is not required. To overcome this, the nodes which have performed the ring switch (node A and D in this case) will continuously monitor the third fiber. When nodes A and D sense that there is a WTR or idle condition in the third fiber, they will drop the ring switch and will go for the third fiber span switch. In this way, secondary (extra) traffic will be restored.

(See Rule 4 and Rule 5).

S4. Bidirectional multiple failures on main fibers.

This particular scenario is very similar to the scenario discussed above (S3). In the above scenario S3, upon the first cut there will be a unidirectional span switch. Here, similarly, if there is bidirectional failure there will be a bidirectional span switch as discussed in S2. At this time, if there is a second failure in another span of the ring, a ring switch will be performed. In this case also, the recovery procedure will be the same as mentioned in the scenario S3.

(See Rule 4 and Rule 5).

Figure 9:
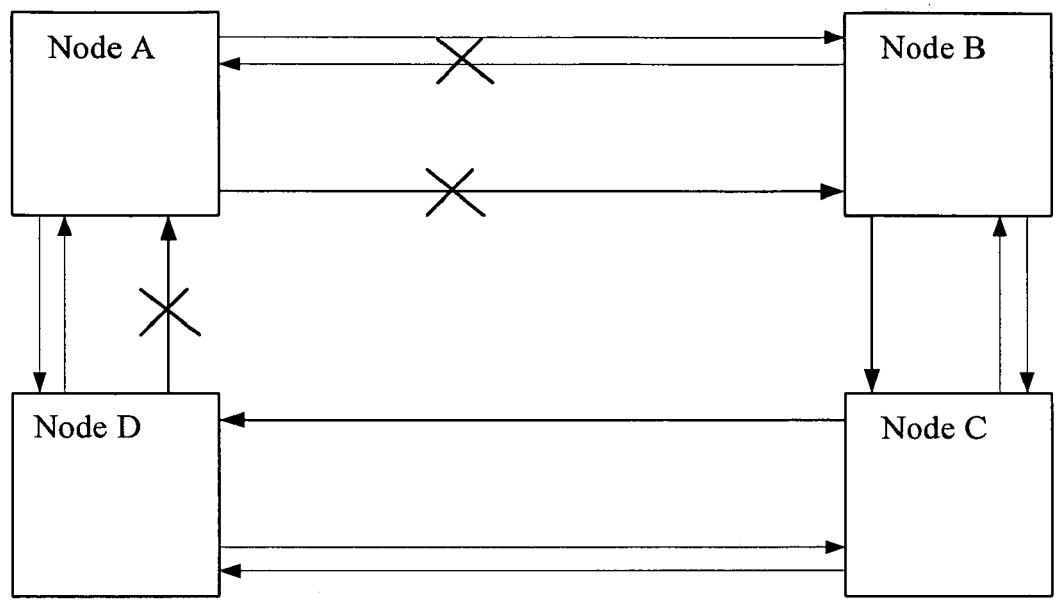
FIG. 9 illustrates a multiple failure scenario where failure is present on main fibers as well as the third fiber; and, FIG. 10 illustrates a typical node failure in a 3FLSR.

S5, Unidirectional main fiber failure and simultaneous 3rd Fiber failure: See FIG. 9.

S5.1. in the same span.

S5.2 In the different span.

When the main fiber gets cut, span switching will be performed as discussed in scenarios S1.1 and S1.2. Now, if any section of the third fiber throughout the ring is cut, Signal Fail protection will be sent along the third fiber. For example, for a third fiber cut between A and B, B will sense the signal failure in the third fiber. Then B will start sending SF-P along the third fiber. Upon receiving SF-P in the third fiber, nodes A and B will initiate a ring switch for the cut in the main fibers.

The same result will happen if the third fiber gets cut between node A and D.

The recovery scenario will be taken care of by Rule 5 and Rule 6, as discussed in detail in scenario 3 and 4.

S6, Bidirectional single failure on main fiber and simultaneous 3rd fiber failure.

This scenario is similar to the scenario S5 discussed above. When there is a third fiber failure, signal fail—protection will be sent along the third fiber which has the highest priority. For the main fiber failures, ring switch will be performed.

Figure 10:
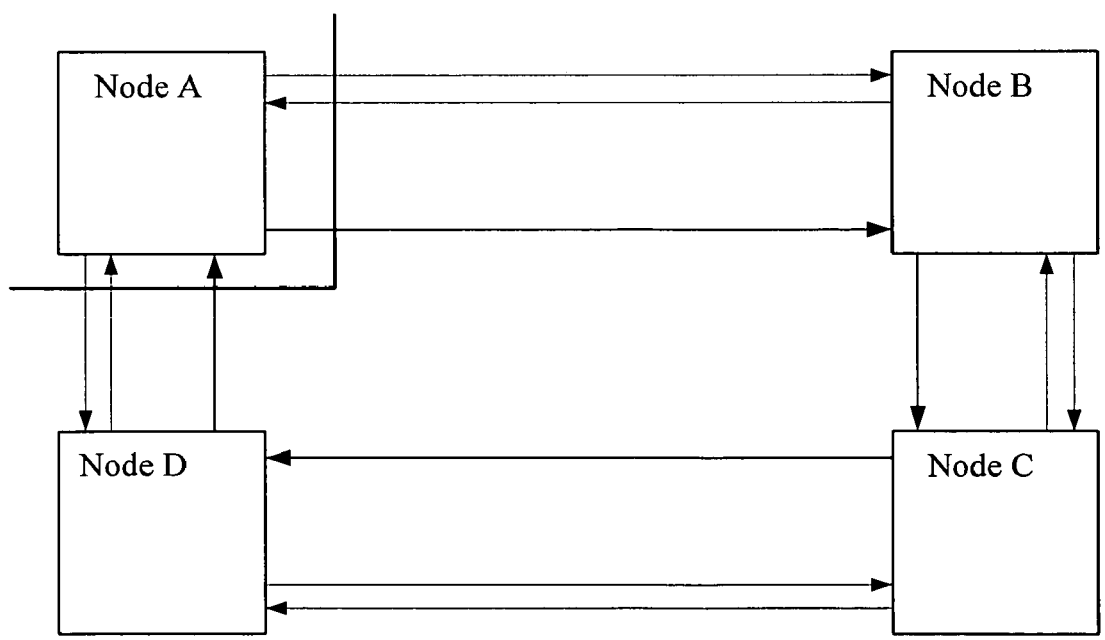

S7, Node failures: See FIG. 10.

Shown herein is the analysis of what happens if a node fails. Suppose node A fails and therefore the traffic cannot reach node A, then node B will sense the signal failure in the third fiber and will send SF-P throughout the ring. Consequently there will be no span switch on the third fiber throughout the ring. For the main fibers, ring switching will be performed at node B and node D according to 2F BLSR rules as stated in standard GR1230.

S8. Squelching of traffic.

The rules for squelching the traffic will be the same as 2F BLSR as stated in standards GR1230 and G841. No new rules nor any change are required in this scenario.

S9. Hierarchy of switching.

Hierarchy of protection switching also is the same as for 2F/4F BLSR and there is no change required as a part of this activity.

The foregoing are examples of several failure scenarios along with how the restoration and protection issues are handled, in the implementation of the 3FLSR configuration. It is envisaged that there are other scenarios and methods of handling the scenarios not specifically addressed hereinabove, but such scenarios fall within the ambit of the inventive 3FLSR arrangement.

The following advantages are noted in the implementation of the 3 FLSR applications:

1. Cost advantage:
   a. Inventory cost is less than 4F BLSR as we need to support three TR cards as compared to 4 TR cards in 4F.
   b. Fiber cost is less compared to 4F as it requires only 3 fibers in a span as compared to 4 in 4F BLSR.
2. It can survive two bidirectional failures in a ring compared to one in 2F BLSR.
3. Bandwidth utilization:
   a. Extra traffic is protected in a single failure in the ring. In a 2F BLSR, extra traffic is lost on a single switch.
   b. Three classes of traffic, primary secondary and additional (see definitions below).

Service provider will have more flexibility to prioritize the traffic. In 2F and 4F BLSR there are only two types of traffic (primary and extra).

It is also noted that traffic is protected well within 50 ms by the use of the 3FLSR. It is also noted that, in addition to the ability to handle primary traffic, secondary traffic and additional traffic, the advantage of 3 FLSR-configuration is that existing 2F/4F installations can be reconfigured for 3 BLSR. Optical vendors, by the use of 3 BLSR can offer cost effective solutions with more capacity at reduced cost. It is also noted that the 3FLSR is aligned with the 2/4 fiber BLSR standards GR-1230 and ITU-T G.841.

It is understood that modifications in the method and article described hereinabove for the 3FLSR configuration are possible without departing from the thrust of the inventive process and are within the scope of the invention. It is also understood that acronyms used herein are to be understood as explained herein, and those that are not addressed should be understood as commonly known in the art. The scope of the present invention is limited only by the following claims and their equivalents.

The invention claimed is:

1. A method for arranging traffic transmission and protection in a three fiber line switched ring (3 FLSR) network of N nodes, comprising the steps of:

Providing first and second fibers traversing in opposite directions and spanning the N nodes for bidirectional line switching, wherein each of the first and second fibers includes working channels for carrying primary traffic and protection channels for carrying secondary traffic;

providing an only additional fiber as a third fiber connected in a single direction in clockwise or anticlockwise direction spanning all the nodes and co-operating with the first and second fibers and supporting co-existence of unidirectional line switching and bi-directional line switching, wherein each node is configured to selectively perform addition, dropping, or passing through of transmission traffic, wherein supporting the co-existence of unidirectional line switching and bi-directional line switching comprises:

when one failure occurs in one of the first and second fibers of the 3 FLSR network of N nodes, initiating a span switch to carry traffic flow of the one of the first and second fibers in which the failure occurs through the third fiber thereby providing the unidirectional line switching, wherein carrying the traffic flow of the one of the first and second fibers in which the failure occurs through the third fiber includes carrying both the primary and secondary traffic of the one of the first and second fibers in which the failure occurs through the third fiber; and when two failures occur in the 3 FLSR network of N nodes, initiating a span switch to carry traffic flow affected by a first failure and a ring switch to carry traffic flow affected by a second failure thereby supporting the co-existence of the unidirectional and bi-directional line switching, wherein the two failures comprise two failures in the first fiber, two failures in the second fiber or one failure in the first fiber and other failure in the second fiber, and wherein carrying the traffic flow affected by the second failure includes carrying the primary traffic of each of the first and second fibers and loosing the secondary traffic of each of the first and second fibers; and, using the third fiber selectively for protection when there are one or two failures, and handling additional traffic in the clockwise or anticlockwise direction when there are no failures in the 3 FLSR network of N nodes.

2. The method as in claim 1, including the step of achieving protection in an event of failure, by a selective combination of unidirectional line level and bi-directional line level switching.

3. The method as in claim 1, where said ring network comprises an optical ring network, wherein said first and second fibers form a main transmission line, and selectively supporting multiple unidirectional line level switches, and supporting multiple unidirectional line level switches along with bidirectional switching.

4. The method as in claim 3, including the step of handling three types of traffic comprising primary traffic, secondary traffic and additional traffic in SONET/SDH.

5. The method as in claim 4, wherein said primary traffic has highest priority, said secondary traffic has medium priority, and said additional traffic has lowest priority.

6. The method as in claim 5, where in case of no failures in said ring network, primary and secondary traffic flows through the main transmission line, additional traffic flows through said third fiber.

7. The method as in claim 1, including the step of performing signaling in said first, second and third fibers using K1-K2 bytes wherein information carried on K1-K2 bytes of the first, second and third fibers acting as transmission lines is not necessarily the same.

8. The method as in claim 7, including performing signaling of a switched stratus by combination 100 in bits 6-8 of the K2 byte.

9. The method as in claim 1, including first considering the third fiber for protecting traffic.

10. The method of claim 9, including using K1-K2 byte signaling in the third fiber for performing time slot interchange of said traffic.

11. The method as in claim 1, configured to support primary, secondary and additional classes of traffic in SONET/SDH.

12. A non-transitory computer readable storage medium for arranging traffic transmission and protection in an optical three fiber line switched ring (3 FLSR) network of N nodes, having instructions thereon which when executed by a computing platform result in execution of method, comprising the steps of:

providing first and second fibers traversing in opposite directions and spanning the N nodes for bidirectional line switching, wherein each of the first and second fibers includes working channels for carrying primary traffic and protection channels for carrying secondary traffic;

providing an only additional fiber as a third fiber connected in a single direction in clockwise or anticlockwise direction spanning all the nodes and co-operating with the first and second fibers and supporting co-existence of unidirectional line switching and bi-directional line switching, wherein each node is configured to selectively perform addition, dropping or passing through of transmission traffic, wherein supporting the co-existence of unidirectional line switching and bi-directional line switching comprises:

when one failure occurs in one of the first and second fibers of the 3 FLSR network of N nodes, initiating a span switch to carry traffic flow of the one of the first and second fibers in which the failure occurs through the third fiber thereby providing the unidirectional line switching, wherein carrying the traffic flow of the one of the first and second fibers in which the failure occurs through the third fiber includes carrying both the primary and secondary traffic of the one of the first and second fibers in which the failure occurs through the third fiber; and when two failures occur in the 3 FLSR network of N nodes, initiating a span switch to carry traffic flow affected by a first failure and a ring switch to carry traffic flow affected by a second failure thereby supporting the co-existence of the unidirectional and bi-directional line switching, wherein the two failures comprise two failures in the first fiber, two failures in the second fiber or one failure in the first fiber and other failure in the second fiber, and wherein carrying the traffic flow affected by the second failure includes carrying the primary traffic of each of the first and second fibers and loosing the secondary traffic of each of the first and second fibers; and, using the third fiber selectively for protection when there are one or two failures, and handling additional traffic in the clockwise or anticlockwise direction when there are no failures in the 3 FLSR network of N nodes.

13. The non-transitory computer readable storage medium as in claim 12, wherein the method includes the step of achieving protection after failure, by supporting co-existence of unidirectional line switching and bidirectional line switching.

14. A three-fiber method for providing optical network traffic transmission and protection, comprising the steps of:

providing first and second fibers as a main transmission line, wherein each of the first and second fibers includes working channels for carrying primary traffic and protection channels for carrying secondary traffic; and, providing a third fiber to cooperate with said first and second fibers and supporting coexistence of unidirectional and bidirectional switching capability, wherein said first and second fibers are connected in a ring, and span a plurality of nodes, wherein the third fiber is connected in a single direction in clockwise or anticlockwise direction spanning all the plurality of nodes, wherein each node is configured to selectively perform addition or dropping or passing through of transmission traffic and including the step of using the third fiber selectively for protection when there are one or more failures, and handling additional traffic in the clockwise or anticlockwise direction when there are no failures in the 3 FLSR network of N nodes, wherein supporting the co-existence of unidirectional and bi-directional switching capability comprises:

when one failure occurs in one of the first and second fibers of the 3 FLSR network of N nodes, initiating a span switch to carry traffic flow of the one of the first and second fibers in which the failure occurs through the third fiber thereby providing the unidirectional line switching, wherein carrying the traffic flow of the one of the first and second fibers in which the failure occurs through the third fiber includes carrying both the primary and secondary traffic of the one of the first and second fibers in which the failure occurs through the third fiber; and when two failures occur in the 3 FLSR network of N nodes, initiating a span switch to carry traffic flow affected by a first failure and a ring switch to carry traffic flow affected by a second failure thereby supporting the co-existence of the unidirectional and bi-directional switching capability, wherein the two failures comprise two failures in the first fiber, two failures in the second fiber or one failure in the first fiber and other failure in the second fiber, and wherein carrying the traffic flow affected by the second failure includes carrying the primary traffic of each of the first and second fibers and loosing the secondary traffic of each of the first and second fibers.

15. The method as in claim 14, including the step of achieving protection after failure, by a selective combination of unidirectional and bidirectional switching.

16. The method as in claim 14, including the step of handling three types of traffic comprising unprotected traffic, traffic protected on a single failure, and traffic protected on multiple failures.

17. The method as in claim 14, including the step of handling three types of traffic comprising primary traffic, secondary traffic and additional traffic in SONET/SDH.

18. The method as in claim 17, wherein said primary traffic has highest priority, said secondary traffic has medium priority, and said additional traffic has lowest priority.

19. The method as in claim 18, where in case of no failures in said ring network, primary and secondary traffic flows through the main transmission line, additional traffic flows through said third fiber.

20. The method as in claim 14, including configuring the third fiber to selectively handle traffic flow in clockwise or anticlockwise direction.

21. The method as in claim 14, including performing signaling of a switched stratus by combination 100 in bits 6-8 of a K2 byte.

22. The method as in claim 14, including first considering the third fiber for protecting traffic.

23. A non-transitory computer readable storage medium for arranging traffic transmission and protection in an optical three fiber line switched ring (3 FLSR) network of N nodes, having instructions thereon which when executed by a computing platform result in execution of method, comprising the steps of:
providing first and second fibers as a main transmission line, wherein each of the first and second fibers includes working channels for carrying primary traffic and protection channels for carrying secondary traffic; and,
providing a third fiber to cooperate with said first and second fibers and supporting coexistence of unidirectional and bidirectional switching capability, wherein said first and second fibers are connected in a ring, and span a plurality of nodes, wherein the third fiber is connected in a single direction in clockwise or anticlockwise direction spanning all the plurality of nodes, wherein each node is configured to selectively perform addition or dropping or passing through of transmission traffic and including the step of using the third fiber selectively for protection when there are one or more failures, and handling additional traffic in the clockwise or anticlockwise direction when there are no failures in the 3 FLSR network of N nodes, wherein supporting the co-existence of unidirectional and bi-directional switching capability comprises:
when one failure occurs in one of the first and second fibers of the 3 FLSR network of N nodes, initiating a span switch to carry traffic flow of the one of the first and second fibers in which the failure occurs through the third fiber thereby providing the unidirectional line switching, wherein carrying the traffic flow of the one of the first and second fibers in which the failure occurs through the third fiber includes carrying both the primary and secondary traffic of the one of the first and second fibers in which the failure occurs through the third fiber; and
when two failures occur in the 3 FLSR network of N nodes, initiating a span switch to carry traffic flow affected by a first failure and a ring switch to carry traffic flow affected by a second failure thereby supporting the co-existence of the unidirectional and bi-directional switching capability, wherein the two failures comprise two failures in the first fiber, two failures in the second fiber or one failure in the first fiber and other failure in the second fiber, and wherein carrying the traffic flow affected by the second failure includes carrying the primary traffic of each of the first and second fibers and loosing the secondary traffic of each of the first and second fibers.

24. The non-transitory computer readable storage medium as in claim 23, including the step of achieving protection after failure, by supporting co-existence of unidirectional line switching and bidirectional line switching.

25. A three fiber line switched ring (3FLSR), comprising first and second fibers for use as a main transmission line, wherein each of the first and second fibers includes working channels for carrying primary traffic and protection channels for carrying secondary traffic, the switched ring including a third fiber configured for cooperating with said first and second fibers and supporting coexistence of unidirectional and bidirectional switching capability, wherein said first and second fibers are connected in a ring, and span a plurality of nodes, wherein the third fiber is connected in a single direction in clockwise or anticlockwise direction spanning all the plurality of nodes, wherein each node is configured to selectively perform addition or dropping or passing through of transmission traffic, and wherein the third fiber is deployed selectively for protection when there are one or more failures, and carrying additional traffic in the clockwise or anticlockwise direction when there are no failures in the 3 FLSR network of N nodes, wherein supporting the co-existence of unidirectional and bidirectional switching capability comprises:
when one failure occurs in one of the first and second fibers of the 3 FLSR network of N nodes, initiating a span switch to carry traffic flow of the one of the first and second fibers in which the failure occurs through the third fiber thereby providing the unidirectional line switching, wherein carrying the traffic flow of the one of the first and second fibers in which the failure occurs through the third fiber includes carrying both the primary and secondary traffic of the one of the first and second fibers in which the failure occurs through the third fiber; and
when two failures occur in the 3 FLSR network of N nodes, initiating a span switch to carry traffic flow affected by a first failure and a ring switch to carry traffic flow affected by a second failure thereby supporting the co-existence of the unidirectional and bi-directional switching capability, wherein the two failures comprise two failures in the first fiber, two failures in the second fiber or one failure in the first fiber and other failure in the second fiber, and wherein carrying the traffic flow affected by the second failure includes carrying the primary traffic of each of the first and second fibers and loosing the secondary traffic of each of the first and second fibers.

26. The 3FLSR as in claim 25, configured for achieving protection after failure, by supporting co-existence of unidirectional line switching and bidirectional line switching.

27. The 3FLSR as in claim 25, configured for handling three types of traffic comprising unprotected traffic, traffic protected on a single failure, and traffic protected on multiple failures.

28. The 3FLSR as in claim 25, including the step of handling three types of traffic comprising primary traffic, secondary traffic and additional traffic in SONET/SDH.

29. The 3FLSR as in claim 28, wherein said primary traffic has highest priority, said secondary traffic has medium priority, and said additional traffic has lowest priority.

30. The method as in claim 29, where in case of no failures in said ring network, primary and secondary traffic flow through the main transmission line, additional traffic flows through said third fiber.

31. The 3FLSR as in claim 25, wherein the third fiber is configured to selectively carry traffic flow in clockwise or anticlockwise direction.

32. The 3FLSR as in claim 25, configured for signaling of a switched status by combination 100 in bits 6-8 of a K2 byte.

33. The 3FLSR as in claim 25, configured for first considering the third fiber for protecting traffic.

* * * * *